United States Patent [19]

Geluk

[11] 4,087,837
[45] May 2, 1978

[54] X-RAY PICTURE CODING

[75] Inventor: Ronald Jan Geluk, Nootdorp, Netherlands

[73] Assignee: N. V. Optische Industrie "De Oude Delft", Delft, Netherlands

[21] Appl. No.: 633,979

[22] Filed: Nov. 20, 1975

[30] Foreign Application Priority Data

Nov. 26, 1974 Netherlands ......................... 7415409

[51] Int. Cl.² ...................... H04N 3/00; G01N 23/20; G02B 5/18
[52] U.S. Cl. ..................................... 358/111; 250/510; 250/272
[58] Field of Search ........................ 178/DIG. 5, 6.8; 358/111; 250/505, 510, 514, 272, 273, 274

[56] References Cited

U.S. PATENT DOCUMENTS 3,950,613   4/1976   Macouski ............................. 358/111

Primary Examiner—Robert L. Griffin
Assistant Examiner—Edward L. Coles
Attorney, Agent, or Firm—O'Brien & Marks

[57] ABSTRACT

A system is disclosed for forming a video representation of an X-ray shadow picture of a body. The system comprises an X-ray source, an X-ray screen, a video circuit with scanning means and display means, and a plate positioned between the X-ray source and the body. The plate has a transparency to X-radiation varying over its surface for spatially coding the X-rays. The system includes means in the video circuit for decoding the signal produced by the scanning means so that in the picture produced by the display means, the influence of the scattered radiation caused by the body is substantially eliminated.

4 Claims, 4 Drawing Figures a b c d e

X-RAY PICTURE CODING

The present invention relates to a system for forming a video representation of an X-ray shadow picture of a body, including an X-ray source, an X-ray screen and a video circuit with scanning means and display means.

Such systems are known in the prior art and can be used to make X-ray shadow pictures accessible to direct study. However, the known systems have the drawback that the resultant television picture may be substantially disturbed under influence of scattered radiation produced in the irradiated body, thus reducing the information provided by the television picture and decreasing the contrast, at least locally.

It is the object of the invention to eliminate the drawback of the local decrease in contrast, to which effect according to the invention a system of the above-described type is characterized by a plate positioned between the X-ray source and the body, which plate has a transparency to X-radiation varying over its surface for spatially coding the X-rays, and by means incorporated in the video circuit for decoding the signal provided by the scanning means so that in the image produced by the display means, the influence of the scattered radiation caused by the body is substantially eliminated.

According to a further embodiment of the invention, a system of the above type is characterized in that the plate consists of parallel, strip-like portions, the alternate strips having a high and a low transmission coefficient; and that the X-ray screen is adapted to be scanned by the scanning means in a direction substantially perpendicular to the strips of the plate.

Furthermore, according to the invention, such system is characterized in that the means for decoding the signal produced by the scanning means includes integrating and holding circuitry controlled by a plate defined reference signal for periodically averaging the signal; first clamping means for clamping with the same periodicity the signal on the reference potential; a holding circuitry adapted to be operative with the same periodicity; second clamping means for clamping with the same periodicity the signal produced by the scanning means with the output signal of said holding circuitry; and controlled amplifying means for amplifying, with the same periodicity alternately with a first and a second gain factor the signal produced by the second clamping means for compensating for the attenuations caused by the strips.

According to a still further embodiment of the invention, such system is characterized in that for the periodic control of the integrating and holding circuitry, the first clamping means, the holding circuitry, the second clamping means and the amplifying means, use can be made of a reference switching signal derived from the signal produced by the scanning means, in which respect the system is furthermore characterized by a circuit for forming the reference switching signal from the signal produced by the scanning means, including a first amplifier which has a negative feedback by means of a delay line having a delay time equal to half a period of the strips-defined periodicity; a second amplifier coupled with the output of the first amplifier, said second amplifier having a positive feedback by means of a delay line having a delay time of one line period of the scanning means; and a trigger circuitry coupled with the output of the second amplifier for forming an ultimate block-shaped reference switching signal.

One embodiment according to the invention will now be described, with reference to the accompanying drawings, wherein FIG. 1 shows diagrammatically a system according to the invention;

Figure 1:
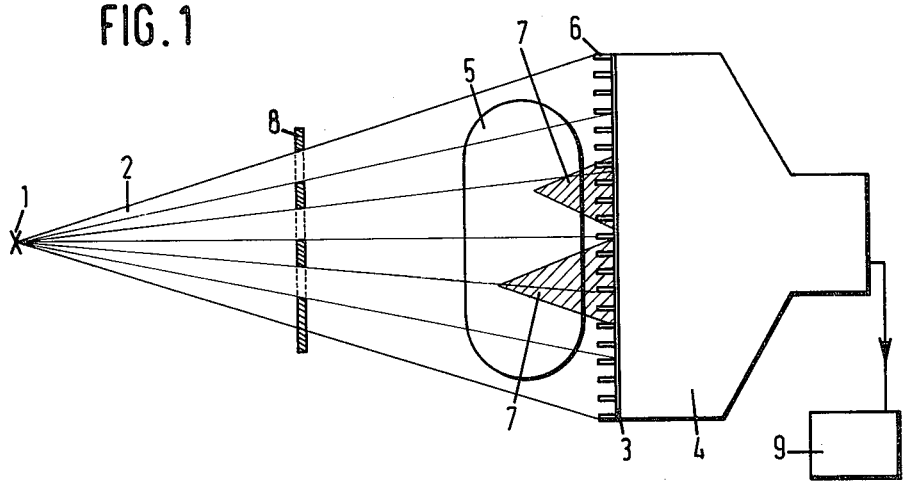

FIG. 1 shows an X-ray source 1 adapted to emit X-rays 2 which can be intercepted on the screen 3 of an X-ray image amplifier 4. Between the source 1 and the screen 3 there can be positioned a body 5 to be irradiated, e.g. that of a patient. Between the body 5 and the screen 3 there may be present a collimating grid 6 consisting of lead strips, as often employed in the prior art for reducing the scattered radiation effect. The figure diagrammatically shows at 7 the scattered radiation produced in the body 5. The operation of the collimating lead strip grid 6 is based on the fact that the incidence of the scattered radiation 7 on the screen will be substantially at a more acute angle relative to the face of the screen 3 than the primary radiation 2. The lead strips run parallel with each other with their elongated narrow sides adjacent the screen 3 and as a result can partially intercept the scattered radiation with their broad sides, while the primary radiation can pass between the lead strips through 40 the screen 3. In order to increase the percentage of the scattered radiation intercepted by the lead strips, said strips would have to be increased in their height. However, in such case the thickness of the strips, because of structural constraints, would also have to be increased so that the strips would intercept also more primary radiation.

In order to solve this problem, there is disposed between the X-ray source 1 and the body 5 a plate 8, which serves for spatially coding the primary X-radiation 2. To accomplish this the plate 8 has a spatially varying transmission factor. For instance, the plate 8 may contain uniformly spaced apart strip-like regions having a lower transmission factor than the other regions. However, the plate may also be a grid of parallel, interspaced strips. The strips provide a transmission factor to X-radiation of 50% such that they transmit therethrough about one-half of the incident radiation according to a preferred embodiment of the invention.

Through the presence of the plate 8, as already observed, the primary X-radiation is spatially coded, but the secondary scattered radiation is not, so that it is possible in principle, in a video circuit 9 following the image amplifier 4, to discriminate between the signal produced by the primary radiation and that portion of the signal produced by the scattered radiation contribution. At the same time it is possible to eliminate from the picture the visually objectionable raster structure caused by the plate 8.

Figure 2:
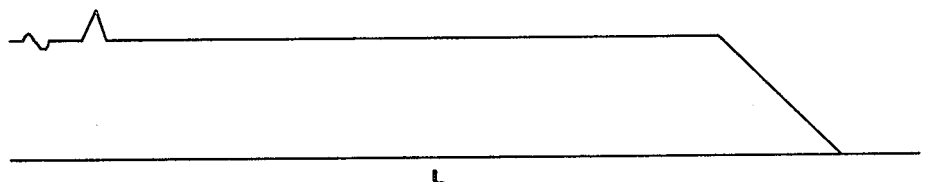
FIG. 2 shows some signal forms which may occur in the system according to the invention.
Figure 2:
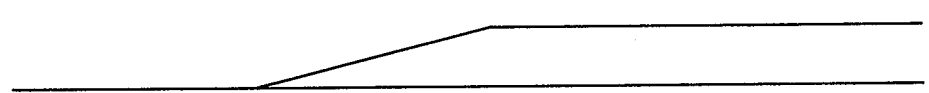
Figure 2:
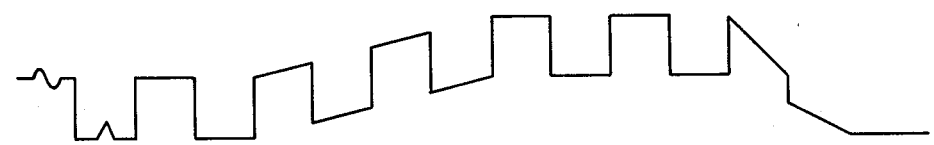
Figure 2:
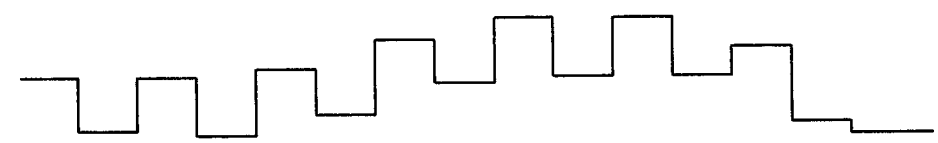
Figure 2:
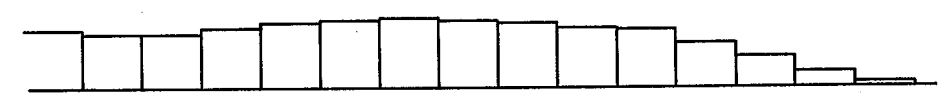

For clarity's sake FIG. 2 shows an example of the electronic signals at various points in the decoding circuitry for one line of a video signal obtained by scanning of the screen 3. The scanning takes place perpendicularly to the strips of the grid 8. FIG. 2a shows the characteristic transmissive distribution of a possible body. This is the form which the ultimate video signal should have. FIG. 2b shows a possible amplitude distribution characteristic of the scattered radiation. If the primary radiation has been spatially coded by the plate 8 (modulation depth e.g. 50%), there is produced at the output of the screen 3 a total video signal as shown in FIG. 2c.

The signal shown in FIG. 2d can be obtained by averaging the non-horizontal portions of the signal of FIG. 2c in phase-synchronous relationship with the spatial coding. The resultant signal may be then phase synchronously clamped and likewise be subjected to a holding operation so that the signal of FIG. 2e is obtained. By clamping the signal of FIG. 2c on the signal of FIG. 2e, there is produced the signal of FIG. 2f. This signal has already bad removed from it the effect caused by the scattered radiation of FIG. 2(b), while the signal still includes the effect of the the spatial coding. If now the signal of FIG. 2f is amplified synchronously with respect to the spatial encoding of the plate, there is produced the desired signal, which is substantially free from both scattered radiation and the spatial encoding and which is shown in FIG. 2g. Note that in those places where the scattered radiation level is changed, there remains a small ripple. Said ripple, however, will in general remain minimal because the scattered radiation value normally changes only very gradually.

Some advantages of the described decoding principle are that a high degree of suppression of the spatially encoded structure of the plate 8 is obtained, so that a relatively low coding frequency can be employed, and a reliable phase-synchronous reference signal can be derived in a manner to be described.

Figure 3:
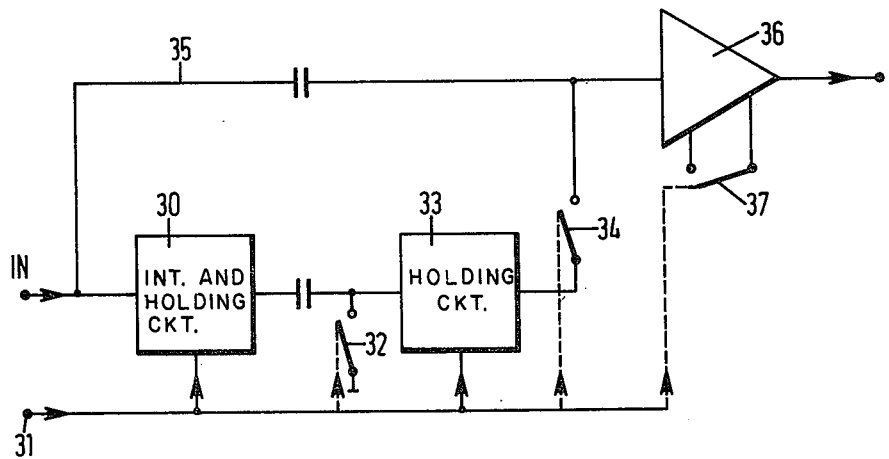
FIG. 3 shows diagrammatically an apparatus for decoding the signal produced by the scanning means.

FIG. 3 shows diagrammatically an apparatus included in the input to the video circuit 9 for forming the ultimate video signal from the signal produced by the scanning of the screen 3. The input signal from the scanning of the screen 3 shown in FIG. 2c, is first applied to an integrating and sample-holding circuitry 30, which is controlled by a phase-synchronous reference signal applied to a terminal 31, so that all high frequency components in the spatially encoded portions of the signal that correspond with the strips and the interstrip areas are removed from the signal. Thus there is produced the signal shown in FIG. 2d. This signal is then clamped by a clamping device 32 again controlled by the phase-synchronous reference signal, whereby the low horizontal portions of the signal shown in FIG. 2d each time are set at zero level. The clamping device 32 is connected to a sample-holding circuitry 33 controlled by the phase-synchronous reference signal, so that the openings in the clamped signal are filled in and the signal of FIG. 2e is obtained at the output of the holding circuitry 33.

The resultant signal is then applied to a second synchronous clamping device 34, which again is controlled by the phase-synchronous reference signal. The clamping device 34 can clamp the video signal from the screen 3 (FIG. 2c) entering via a line 35 synchronously on the signal of FIG. 2e, so that there is produced a scattered radiation-deprived, but plate-coded, signal (FIG. 2f). The signal of FIG. 2f can now be applied to an amplifier 36, of which the gain is controlled by the phase-synchronous reference signal, so that the plate-produced spatial coding is eliminated. For example this gain control may be performed by means of of a switching means 37, which each time is brought in such position that the periodic attenuation caused by the plate 8 is eliminated through the associated gain.

Figure 4:
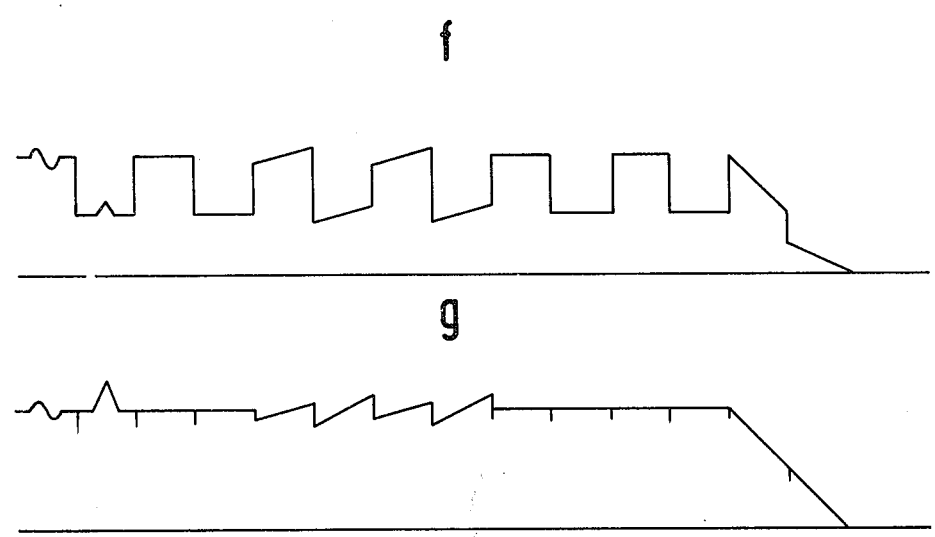
FIG. 4 shows diagrammatically an apparatus for forming a reference switching signal for use in the control of the apparatus shown in FIG. 3.
Figure 4:
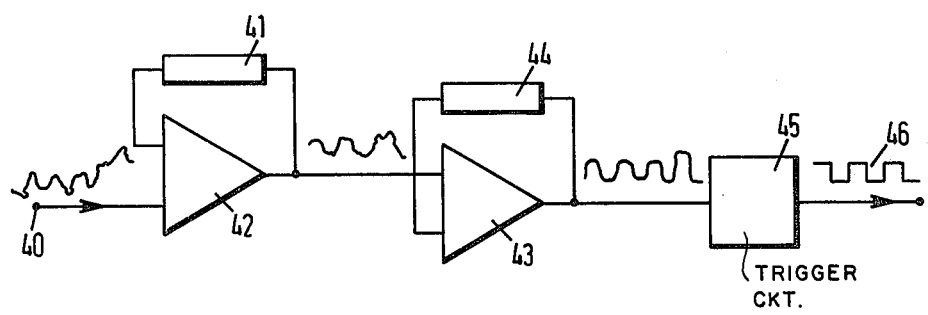

FIG. 4 shows a device for forming the phase-synchronous reference signal, which can be advantageously derived from the video signal itself from the screen 3. There is therefore the signal shown in FIG. 2c. Said video signal is applied to an input terminal 40 of a first amplifier 42 which has a negative feedback by means of a delay line 41. The delay line 41 has a delay time equal to half a period of the employed plate 8. As a result an averaging in horizontal direction is obtained. This is necessary in order to have discrimination of the proper signal even in very "dark" regions and among picture information and noise.

It is also possible to feed forward the amplifier 42 by means of a delay line providing a delay time of a whole number of complete periods. In order to also obtain an averaging in vertical sense, there is provided a second amplifier 43 connected to the output of the first amplifier 42. Amplifier 43 has a positive feedback by means of delay line 44. Delay line 44 has a delay time equal to one line period.

Finally, the output signal of the second amplifier is applied to a trigger circuitry 45 for forming a block-shaped switching signal 46, which is applied to the terminal 31 of FIG. 3.

The reliability of the resultant reference signal 46 depends inter alia on the spatial coding frequency of the plate 8. Accordingly, as the coding frequency is lower, the reliability of the reference signal increases, but the amplitude of the ripple in the signal of FIG. 2g then increases.

In practice a compromise will be chosen, wherein the frequency lies e.g. between 100 kHz and 3 MHz, using conventional video scanning standards.

I claim:

1. A system for forming a video display of an X-ray picture of a body comprising
    a source of X-rays for transmitting X-rays through the body,
    an X-ray screen for receiving the X-rays that pass through the body,
    a video circuit including scanning means for scanning the screen and producing a video signal and including display means for displaying the output thereof,
    a plate positioned between the source of X-rays and the body, the plate having a spatial variation in its transparency to X-rays to cause the scanning means to produce an encoded video signal, and
    decoding means in the video circuit for decoding the encoded video signal produced by the scanning means so that in the display produced by the display means, the influence of scattered radiation is substantially eliminated, the decoding means including integrating and sample-holding circuitry controlled by a reference signal to periodically average the encoded video signal, first clamping means to clamp the output of the integrating and sample-holding circuitry synchronously with the reference signal, sample-holding circuitry operating on the output of the first clamping means, second clamping means for clamping over the same period the output of the sample-holding circuitry with the encoded video signal from the screen, and controlled amplifying means for amplifying the signal produced by the second clamping means with a variable gain to compensate for the encoding of the plate.

2. A system as claimed in claim 1 wherein the plate includes a plurality of parallel strip-like portions having alternately high and low transmission coefficients, the scanning means scanning the screen in a direction perpendicular to the strip-like portions.

3. A system as claimed in claim 1 wherein the reference signal which controls the periods of the first and second clamping means, the integrating and sample-holding circuitry and the sample-holding circuitry is derived from the output of the scanning of the screen.

4. A system as claimed in claim 3 further including circuitry for forming the reference signal including a first amplifier with a negative feedback having a delay time of one half of the signal period, a second amplifier receiving the output of the first amplifier having a positive feedback having a delay time of one full signal period and a trigger circuit coupled to the output of the second amplifier to form the reference signal.

* * * * *